United States Patent
Lucas

(10) Patent No.: US 7,339,473 B2
(45) Date of Patent: Mar. 4, 2008

(54) ENCLOSURE SECURITY DEVICE

(75) Inventor: Donald L. Lucas, 826 Plateu Rd., Longmont, CO (US) 80504

(73) Assignee: Donald L. Lucas, Longmont, CO (US)

( * ) Notice: Subject to any disclaimer, the term of this patent is extended or adjusted under 35 U.S.C. 154(b) by 133 days.

(21) Appl. No.: 11/392,358

(22) Filed: Mar. 29, 2006

(65) Prior Publication Data
US 2006/0232380 A1 Oct. 19, 2006

Related U.S. Application Data

(60) Provisional application No. 60/667,430, filed on Apr. 1, 2005.

(51) Int. Cl.
*G08B 13/08* (2006.01)

(52) U.S. Cl. .................. 340/545.1; 340/5.7; 340/5.73; 340/542; 340/566; 340/686.3; 340/687; 70/57.1; 70/107

(58) Field of Classification Search ............ 340/545.1, 340/542, 566, 686.1, 687, 545.6, 686.3, 692, 340/5.7, 5.73; 70/57.1, 107, 13, 77, 278.1
See application file for complete search history.

(56) References Cited

U.S. PATENT DOCUMENTS

| | | | |
|---|---|---|---|
| 3,736,016 A * | 5/1973 | Garvey et al. ............ 292/281 |
| 4,103,285 A | 7/1978 | Lloyd et al. | |
| 4,368,455 A | 1/1983 | Menard | |
| 4,742,701 A * | 5/1988 | Scavetto ..................... 70/121 |
| 4,750,197 A | 6/1988 | Denekamp et al. | |
| 4,816,803 A | 3/1989 | Brown | |
| 4,904,983 A | 2/1990 | Mitchell | |
| 5,035,127 A * | 7/1991 | Larsen ......................... 70/56 |
| 5,130,695 A | 7/1992 | Scarbrough et al. | |
| 5,475,362 A | 12/1995 | McRae | |
| 5,969,433 A | 10/1999 | Maggiora et al. | |
| 6,092,404 A | 7/2000 | Chhatwal | |
| 6,265,966 B1 | 7/2001 | Ireland et al. | |
| 6,281,793 B1 | 8/2001 | Haimovich et al. | |
| 6,370,481 B1 | 4/2002 | Gamble | |
| 6,400,266 B1 | 6/2002 | Brown, Jr. | |
| 6,441,731 B1 | 8/2002 | Hess | |
| 6,667,449 B2 * | 12/2003 | Wecke et al. ............. 200/61.7 |
| 6,727,806 B1 | 4/2004 | Massie et al. | |
| 6,774,762 B2 | 8/2004 | Bates | |
| 6,844,829 B2 | 1/2005 | Mayor | |
| 6,933,937 B2 | 8/2005 | Gunderson et al. | |
| 7,154,394 B2 * | 12/2006 | Zhou ....................... 340/568.8 |
| 2003/0179073 A1 | 9/2003 | Ghazarian | |

* cited by examiner

*Primary Examiner*—Davetta W. Goins
(74) *Attorney, Agent, or Firm*—Faegre & Benson LLP

(57) ABSTRACT

A device for securing a gated enclosure includes a latch including a power lock motor and a bolt. The power lock motor is operable to engage the bolt with a catch portion of a pin protruding from the gate when the gate is closed, thereby preventing extraction of the pin from the device. The device includes a switch operated by a key to activate the latch. The device can include an electric horn, a light, a battery, and circuitry powered by the battery, the circuitry operable to send a signal to one or more of the horn and the light.

9 Claims, 7 Drawing Sheets

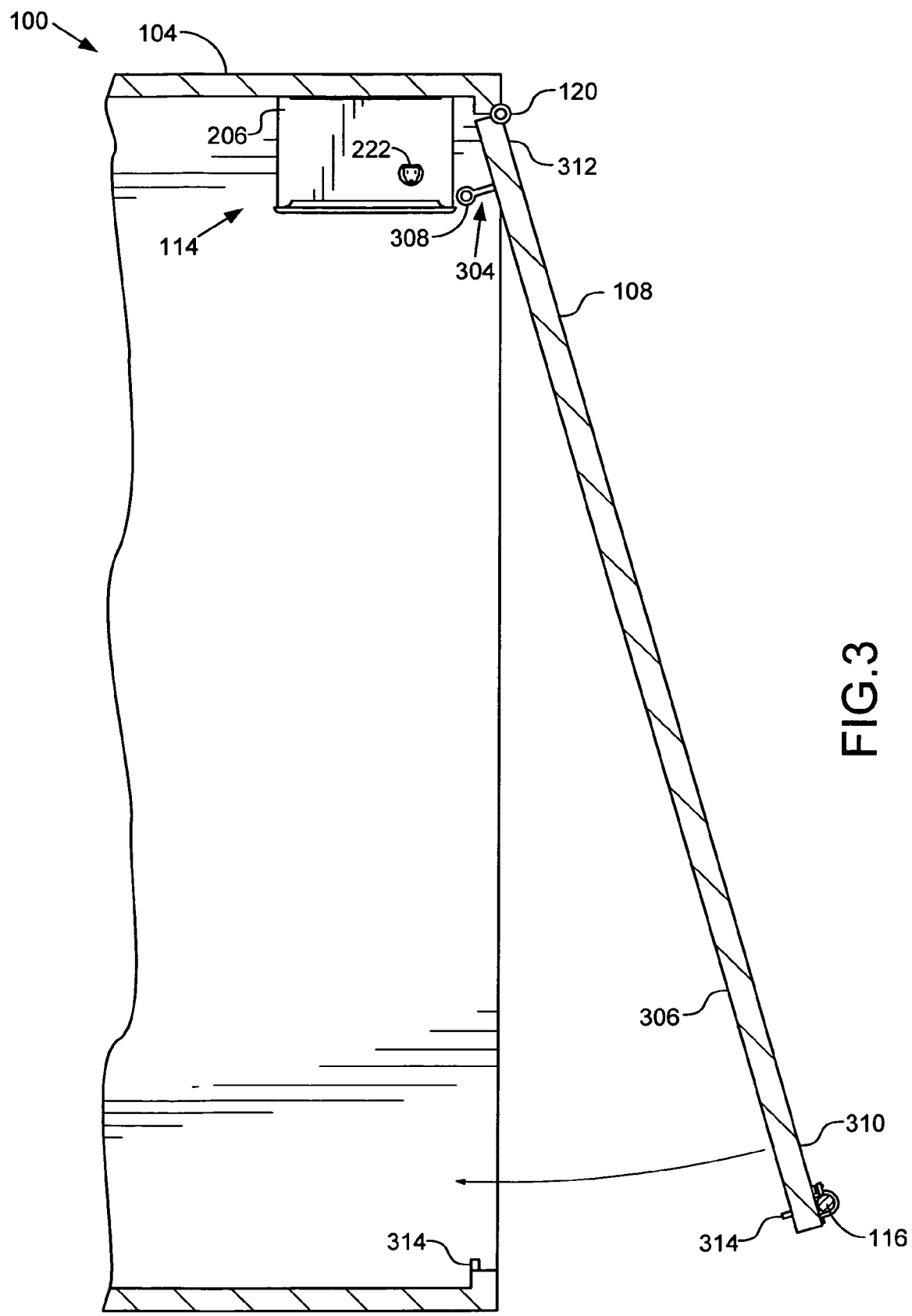

ENCLOSURE SECURITY DEVICE

CROSS-REFERENCE TO RELATED APPLICATIONS

This application claims the benefit of Provisional Application No. 60/667,430, filed on Apr. 1, 2005, which is hereby incorporated by reference for all purposes.

BACKGROUND

Enclosures are used for storing all types of items. Generally, an enclosure is an area that is at least partially enclosed by some type of wall or barrier. Enclosures typically have doors or gates allowing entry and exit, and insertion and removal of items. Many types of enclosures are known. Enclosures may be relatively stationary or they may be portable or mobile. Sheds, houses and cabins are only a few examples of relatively stationary enclosures. Vehicles and trailers can contain enclosures or themselves act as enclosures. Conventional approaches to securing many types of enclosures have been shown to be inadequate.

For example, in the construction industry, trailers are often used to store machines and other equipment during construction projects. Construction projects can last for long periods of time (e.g., months). The trailers often must remain on the construction site for long periods and are often left unguarded. As a result, trailers on construction sites are frequently broken into while the workers are away (e.g., at night). Traditionally, the trailers have a basic mechanism for closing the gates or doors of the trailer. For example, some trailers provide a vertical bar that can be raised to open the gates or lowered into a slot in the floor board to keep the gates closed. A cross-bar can be lowered across the gates and are typically locked with a padlock or similar locking device that is external to the trailer.

Padlocks are often insufficient to stop a thief from breaking into the trailer. Padlocks are easily cut with a tool, such as a hack saw or metal snips. Once the padlock is broken, there is typically no other security mechanism preventing entry into the trailer. Thus, a thief, only using a basic tool, can quickly and easily gain access to the contents of the trailer. After a thief gains entry, often times the thief positions a pickup or van next to the trailer opening and unloads the contents from the trailer into the van or pickup.

However, thieves do not even have to break the lock on the construction site. In the case of trailers and other portable or mobile enclosures, thieves can simply hook up the enclosure to a pickup truck and take the enclosure to another location, where the thieves can safely break into the enclosure.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3 is a cross-sectional, elevation view of a back portion of a trailer and a security device mounted to a wall of the trailer in accordance with an embodiment of the present invention;

DETAILED DESCRIPTION

Exemplary embodiments of enclosure security devices described herein provide enclosure security and/or burglary deterrence. Some embodiments lock a gate or door of the enclosure in a manner that renders breaking entry into the enclosure more difficult than conventional approaches. Some embodiments sense vibration and/or opening of the gate and responsively trigger an alarm. Embodiments of security devices described herein provide a locking mechanism on the inside of the enclosure. The security device can include a controller operable to sound a horn and/or activate lights when attempted break-in is detected. The controller may also be operable to engage the brakes on wheels of a mobile enclosure, dial a phone number and transmit an appropriate notification via cellular phone, or activate a video camera when break-in is detected.

Some embodiments include a modular security assembly that is mountable to a wall of an existing enclosure, such as a trailer. The modular security assembly includes a housing having a wall facing a gate of the enclosure. The gate has securely mounted thereon a protruding member aligned with an aperture of the facing wall of the modular assembly. The protruding member includes a catch that extends into the aperture when the gate is closed. A locking assembly in the housing includes a bolt member aligned with an axis of an aperture of the catch. The bolt member is connected to an actuator such that when the security assembly is engaged, the actuator drives the bolt member through the aperture of the catch. As such, the protruding member is prevented from being retracted from the housing. As a result, the gate is secured in the closed position. More than one locking assembly can be placed at different locations in the enclosure, and aligned with corresponding protruding members, to provide for locking at multiple points on the gate. In addition, the multiple locking assemblies may be locked simultaneously when an engagement signal is received, for example, from a control module housed in the modular security assembly, and in operable communication with the multiple locking assemblies.

Throughout this application, examples and descriptions will be provided regarding the security of a trailer; however, this invention is not limited to the security of a trailer, but can be extended and applied to the security of any type of enclosure. Such enclosures may be mobile, portable, or stationary.

Figure 1:
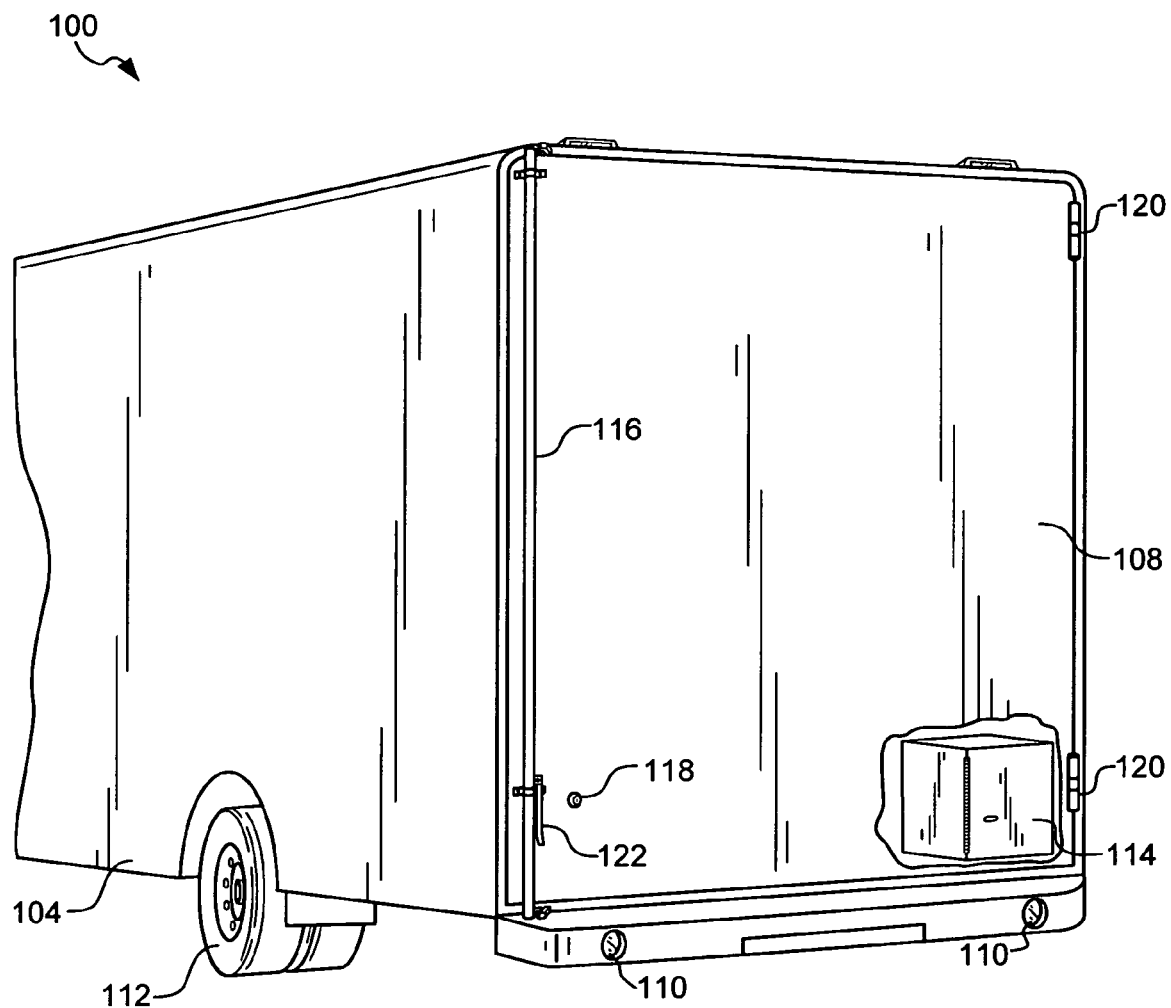
FIG. 1 illustrates a trailer that may be used to enclose various items, wherein the trailer includes a security device in accordance with an embodiment of the present invention.

FIG. 1 illustrates a back portion of an exemplary trailer 100 that can be used to store contents. The trailer 100 is typical of many types of trailers in that it includes a top, sides 104, a floor, and one or two rear gates 108. The trailer 100 also includes one or more rear lights 110 and wheels 112 that can be stopped by brakes (not shown). The rear gate 108 is typically, although not necessarily, hingedly mounted to a side of the trailer 100 via hinges 120. Thus, the gate 108 can swing into an open position and closed position. Gate 108 can be secured in the closed position with a vertical bar 116. A handle 122 enables raising and lowering of the vertical bar 116, for opening and closing the gate 108. The invention is not limited to any particular type of gate or manner of opening and closing of the gate 108. For example, although FIG. 1 illustrates a single gate that swings on hinges, embodiments of the invention can be used in conjunction with multiple gates, sliding gates, or others.

Unlike conventional trailers, the trailer 100 illustrated in FIG. 1 includes a security device 114, shown through a cutaway in the gate 108. The security device 114 is mounted to a side of the trailer 100 in the interior of the trailer 100, toward the back of the trailer 100. The security device 114 includes various components for providing security to the trailer 100, as is discussed in more detail below. The security device 114 can be electrically connected to brakes and/or lights 110.

The security device 114 is generally either activated or not activated. In the activated state, the security device typically sets a breach detection monitor and/or locks the gate 108 closed. In one embodiment, a key is used to activate the security device 114. This embodiment is illustrated in FIG. 1 with a key hole 118 that is electrically connected to the security device 114. In other embodiments, the activating/deactivating of the security device is not through a key or wired connection, but rather through a wireless key remote control device.

In yet another embodiment, activation and/or deactivation of the security device 114 can be triggered through the use of biometric information. By way of example, a finger print authentication can be used. A finger print reader can be implemented on the gate 108. The owner can activate/deactivate the security device 114 by pressing his/her finger on the finger print reader, which sends a signal having an encoded version of the finger print to the security device 114. The security device 114 can include logic for comparing the encoded finger print to a previously stored, valid encoded finger print. Other types of biometric information that can be used include, but are not limited to, face recognition, voice recognition, and/or iris recognition.

Other activating/deactivating mechanisms may be used. For example, pin number entry and/or magnetic card reader could be used. In addition, the activating/deactivating mechanism could use a combination of key, biometric authentication, magnetic card, pin number, or other identity detection mechanisms.

Figure 2:
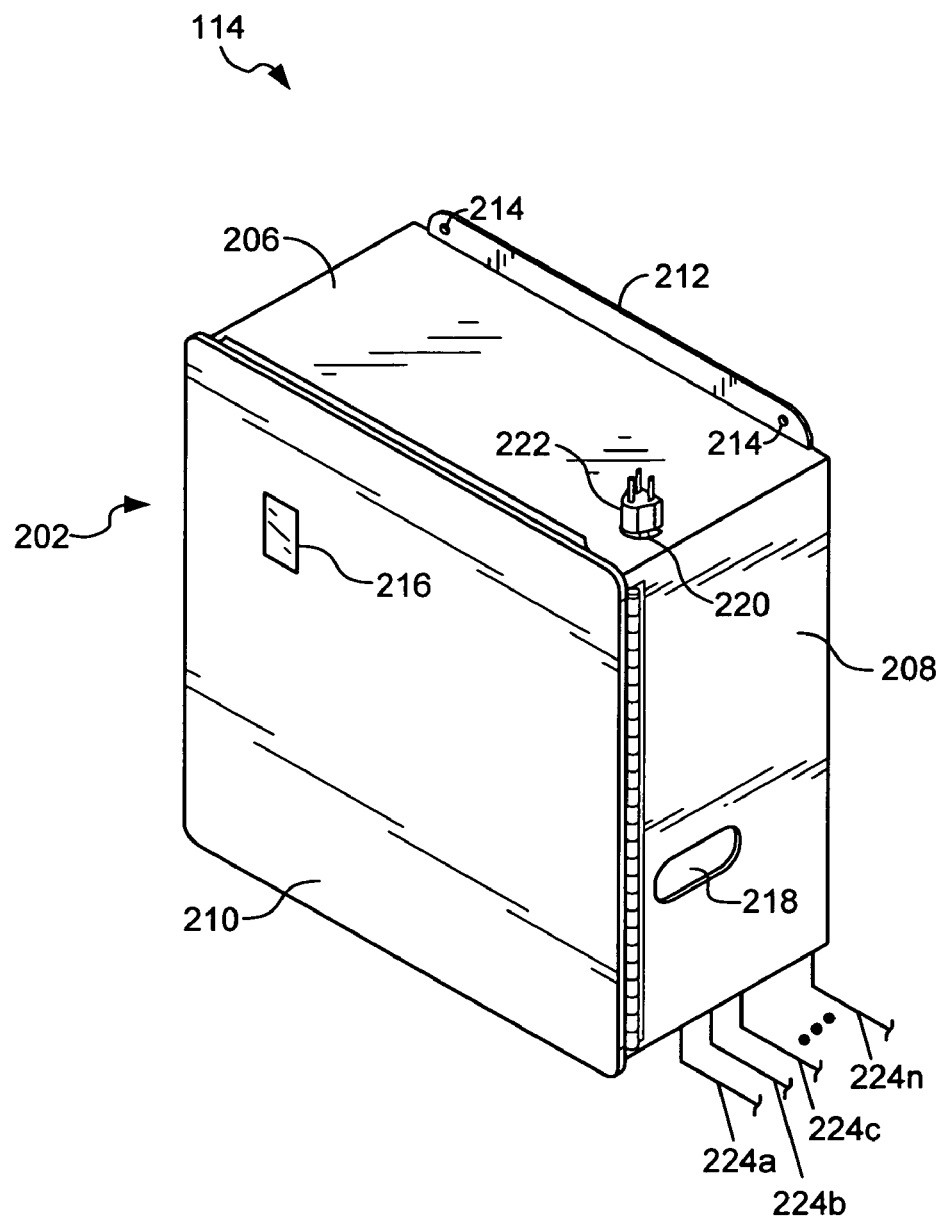
FIG. 2 illustrates an enclosure security device in accordance with an embodiment of the present invention.

FIG. 2 illustrates an enclosure security device 114 in accordance with an embodiment of the present invention. The security device 114 includes a housing 202 that contains various security components. In this embodiment, the housing 202 is formed from metal, however, other materials may be used, such as, but not limited to, plastic and/or composite materials, and can be molded or assembled. The housing 202 is composed of six panels or sides: a top side 206, bottom side (not visible), proximal side 208, distal side (not visible), front side 210, and a back side (not visible).

A tab 212 extends from the top side 206 and includes mounting holes 214 for mounting the security device 114 to a wall of an enclosure. For example, fasteners (e.g., screws, rivets, pins) can be extended through the mounting holes 214 and into a wall of the enclosure. The top side 206 includes a charging connector aperture 220 through which a recharging connector 222 can extend for recharging a battery in the security device 114.

In this embodiment, the front side 210 is hingedly attached to the proximal side 208, thereby enabling the front side 210 to be opened and closed. A charge indicator aperture 216 shows a battery charging status indicator through the front side 212.

The proximal side 208 includes a lock aperture 218, which is discussed in further detail below. Generally, the lock aperture 218 is located at a position on the proximal side 208 such that a pin securely mounted to, and extending from, a gate of the enclosure will enter the lock aperture 218 when the gate is closed.

The security device 114 can be electrically and/or communicably connected to a number of components outside the security device 114. As such, in one embodiment, one or more connection point(s) 224a-224n (e.g., wires, connectors, etc.) extend outside the security device 114 for enabling electrical connection thereto. For example, connection point(s) 224a can connect to an electric key mechanism, connection point(s) 224b can connect to a brake activation mechanism on a trailer, connection point(s) 224c can connect to lights on the enclosure, and connection point(s) 224n can connect to an intrusion detector, such as a magnetic switch. Exemplary circuitry for generating and receiving/using signals on the connection point(s) 224a-224n is discussed in further detail below with reference to FIG. 5.

FIG. 3 is a cross-sectional, elevation view of a back portion of a trailer 100 and a security device 114 mounted to a wall 104 of the trailer 100 in accordance with an embodiment of the present invention. The gate 108 has a distal end 310 and a proximal end 312. Hinges 120 at the proximal end 312 allow the gate 108 to swing open and closed. Of course, in other embodiments, the gate may open in a different manner, such as, but not limited to sliding or folding.

A protruding member, such as pin 304, extends from an interior side 306 of the gate 108. The pin is preferably securely mounted at a location on the interior side 306, such that the pin 304 is aligned with the lock aperture 218 (FIG. 2) of the security device 114. When the gate 108 closes, at least a catch portion 308 of the pin 304 enters the lock aperture 218. The pin 304 includes a catch 308 that can be used to lock the gate 108 in the closed position. The pin 304 can be formed of a strong metal or other material that preferably is stress and strain resistant so that it does not break easily when force is applied.

In the particular embodiment illustrated in FIG. 3, the catch 308 is substantially circular in shape having a circular hollow or aperture in the center. However, the catch 308 is not limited to a substantially circular shape. For example, the catch 308 could be comprised of a perpendicular bar that is perpendicular to a primary axis of the pin 304. In other embodiments, the catch 308 could be another shape, such as a square, or a hook shape. Regardless of the particular shape, the catch 308 does not need to be a closed shape. For example, the catch 308 could be a half-circle or a half-square.

An intrusion detector detects vibration and/or opening of the door of the trailer, and sends a signal to circuitry in the security device. In the embodiment shown, the intrusion detector is implemented as a magnetic switch 314 that is mounted at the distal end 310 of the gate 108, opposite the hinged end 312. The magnetic switch 314 includes two portions, representing opposite poles of a magnet. The magnetic switch 314 sends one or more signals to the security device 114 to indicate whether the gate 108 is open or closed.

In one embodiment, the magnetic switch 314 forms part of a circuit in the security device 114, and is used to detect when an intruder is attempting to enter the trailer 100. When the gate 108 is closed and the portions of the magnetic switch 314 are magnetically connected, the magnetic switch 314 closes the circuit. When the gate 108 is open or the portions of the magnetic switch 314 are not magnetically connected, the circuit is open. An exemplary circuit is described in further detail below.

According to some embodiments, multiple locking assemblies (e.g., locking mechanism 412, FIG. 4, discussed further below) can be provided. For example, the security device 114 may include multiple lock apertures through which the device 114 can receive multiple pins 304, and can include multiple corresponding locking mechanisms that engage a dead bolt with the pins. In accordance with some embodiments, pin 304 may have multiple catches 308, to thereby provide for multiple dead bolt engagement points. In accordance with various embodiments, the one or more locking mechanisms need not be enclosed within the housing of the device 114. For example, a locking mechanism could be positioned at each of multiple locations near the rear of the trailer 100, adjacent to a corresponding pin, such as pin 304. The locking mechanisms can be communicably coupled (e.g., wireless or wired communication) to a control component in the security device 114, such that all the locking mechanisms engage the corresponding pins when the door is closed and the security device is activated, to thereby secure the gate in the closed position. The multiple locking mechanisms may be selectively and/or substantially simultaneously engaged one or more signals from the control component.

In yet other embodiments, multiple security devices 114 may be mounted within trailer 100. For example, some trailers may have more than one gate. As such, a security device 114 may be positioned at each gate. In some embodiments, more than one security device may be associated with each gate. One advantage of having multiple security devices 114 associated with each gate is the additional strength provided in securing the gate.

Figure 4A:
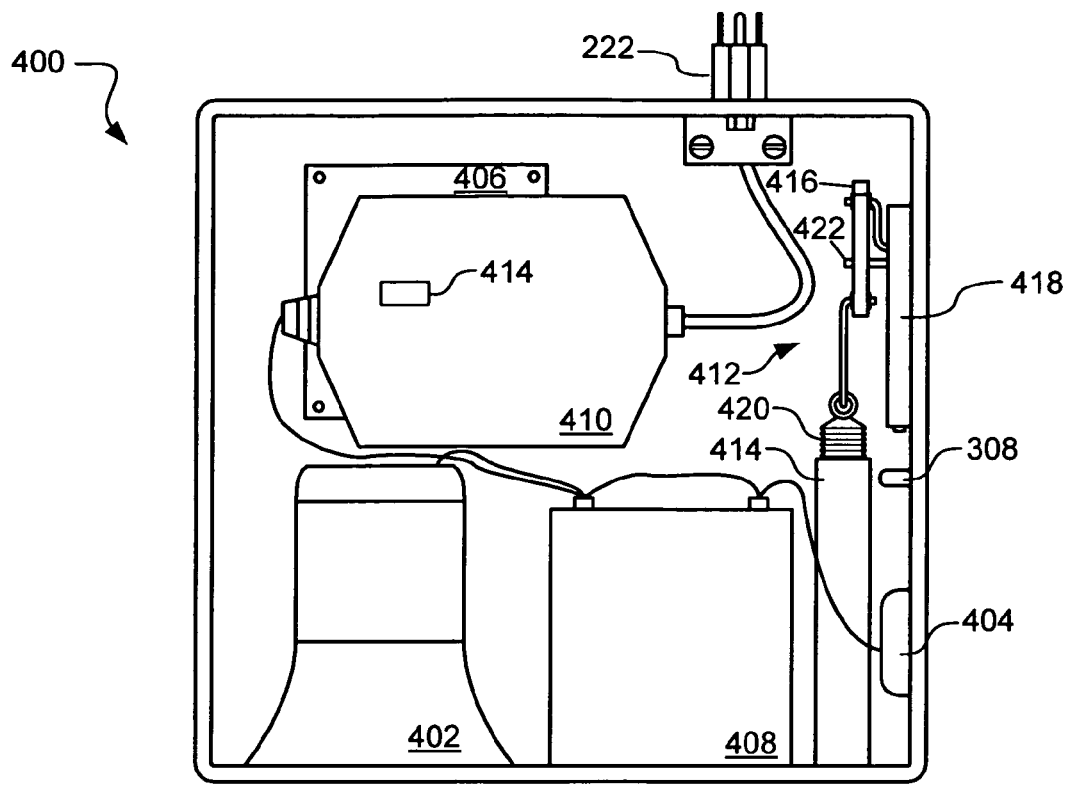
FIG. 4A is a front view of an enclosure security device wherein a dead bolt is in the unlocked position in accordance with an embodiment of the present invention.

FIG. 4A is a front view of the enclosure security device 114 with the front side 210 removed. In FIG. 4A, the security device 114 is unlocked. In this particular embodiment, a latch mechanism 412 provides for locking and unlocking. As illustrated, the latch mechanism 412 in FIG. 4A is in an unlocked position in accordance with an embodiment of the present invention. Prior to discussing the latch mechanism 412 in detail, other components of the security device 114 are briefly described.

In addition to the latch mechanism 412, this embodiment of the security device 114 includes an electric horn 402, a shock sensor 404, security controller 406, a battery 408, a battery charger 410, and a switch (not shown). In this embodiment, the battery 408 is a 12VDC, 5 Ah rechargeable battery from RADIO SHACK CORPORATION™. However, the invention is not limited to this particular type of battery. The battery 408 generally provides power to electrical components in, and/or connected to, the security device 114. For example, the battery 408 can provide power to activate the lights or brakes on the trailer 100. As another example, the battery 408 can provide power to sound the horn 402. As yet another example, the battery 408 can provide power to control and/or communication component(s) and/or circuitry in the security device 114.

The shock sensor 404 detects vibrations due to shocks or impacts to the enclosure, and sends a signal to the controller 406. In a particular embodiment, the shock sensor 404 is implemented with a STINGER DOUBLEGUARD shock sensor, model 504D; however, embodiments are not limited to this particular brand or model of shock sensor.

In one embodiment, the horn 402 is a MINIREVENGER SIREN model 514T, which is available through many retailers, such as RADIO SHACK CORPORATION™. However, the invention is not limited to this particular model or brand. The controller 406 sends a signal to the horn 402 when a specified event (e.g., a shock or impact to the enclosure) is detected. The horn 402 sounds an audible alarm when triggered. Some exemplary events that can trigger sounding the horn 402 include vibrations, and opening (or attempted opening) of the gate.

In one embodiment, the charger 410 is an EVERSTART 1.5 Amp trickle charger. However, the invention is not limited to this particular type of battery charger. The particular type of battery charger is generally selected based on the battery 408 specifications. A charger connector 222 extends from the charger 410 and can be plugged in to a 3-phase 120 volt source. An indicator 414 on the charger 410 indicates whether the battery 408 is being charged.

In this particular embodiment, the switch is a mercury switch; however, the invention is not limited to a mercury switch. The switch is coupled to the latch mechanism 412 for locking, unlocking, and/or arming the security device 114. The switch is activated by a key mechanism. As discussed above, in accordance with various embodiments, a key or other mechanism may be used to lock/unlock the trailer door. In one particular embodiment, by inserting and turning a key into the trailer door, a signal is sent to the switch that indicates either on or off (e.g., activate or deactivate; lock or unlock).

As discussed, the security device 114 includes a latch mechanism 412. In this embodiment, the latch mechanism 412 has a power lock motor 414, a lever arm 416, and a dead bolt 418. In the embodiment shown, the power lock motor 414 is a half (0.5) inch quarter round steel plunger. The power lock motor 414 includes an extendable portion 420 that is connected to the lever arm 416. Action of the power lock motor 414 is triggered by the switch, which is electrically connected to the power lock motor 414. By turning the switch on and off (i.e., closed and open), the extended portion 420 of the power lock motor 414 moves in an upward and downward motion, respectively, to actuate the lever arm 416. In response, up and down rotational motion of the lever arm 416 causes the dead bolt 418 to move up and down, respectively. When the switch is off, the extended portion 420 of the power lock motor 414 is in the down position and the dead bolt 418 is in the up, or unlocked position as shown in FIG. 4A. In a particular embodiment, the latch mechanism 412 is implemented with a 2-wire DEI door lock actuator model 524T; however, embodiments are not limited to this particular door lock actuator.

Figure 4B:
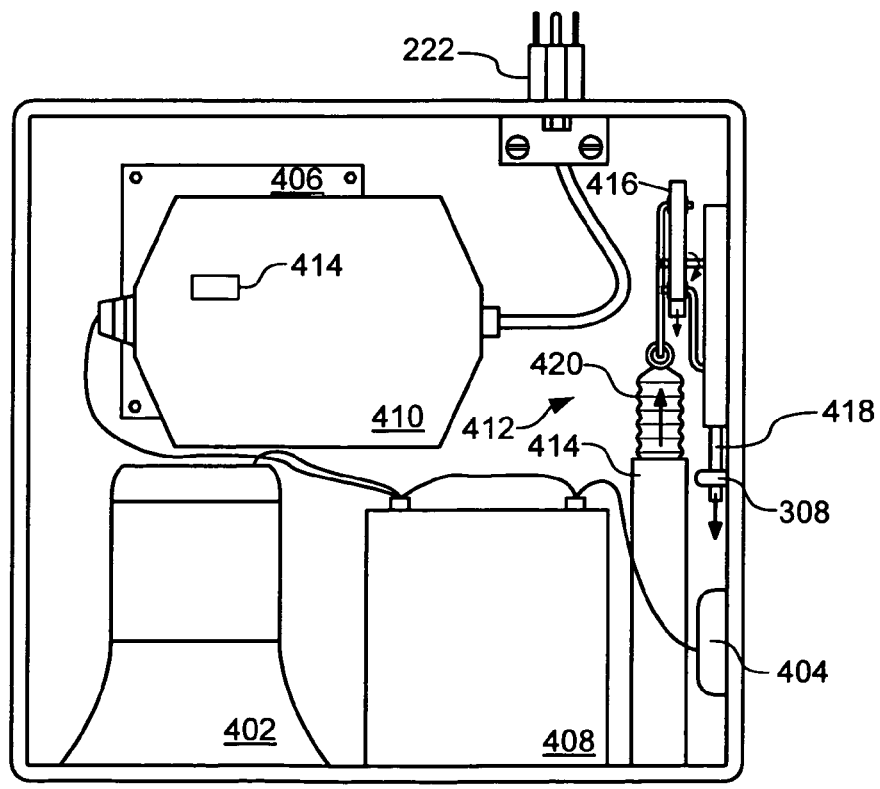
FIG. 4B is a front view of the enclosure security device wherein the dead bolt is in the locked position in accordance with an embodiment of the present invention.

FIG. 4B is another front view of the enclosure security device 114 wherein the dead bolt 418 is in the locked position in accordance with this embodiment of the present invention. When the switch is switched on, the driver module 414 drives the extendable portion 420 up, which rotates the lever arm 416 around the pivot point 422. In response, the dead bolt 418 is driven down. When the door of the trailer is closed, the catch 308 of the pin 304 extends through the lock aperture 218 (FIG. 2) and into the housing of the security device 114, as shown in FIG. 4B. As a result, when the dead bolt 418 is driven down, the dead bolt 418 is engaged with the catch 308, thereby locking the trailer door closed.

It is to be understood that the arrangement of components within the housing of the security device can vary from the particular arrangements shown and described herein. For example, the dead bolt may be oriented horizontally, with the aperture of the catch rotated ninety degrees, such that the dead bolt engages and disengages with the catch in a lateral movement. Many other arrangements and orientations of the various components will be appreciated by those skilled in the art.

Figure 5:
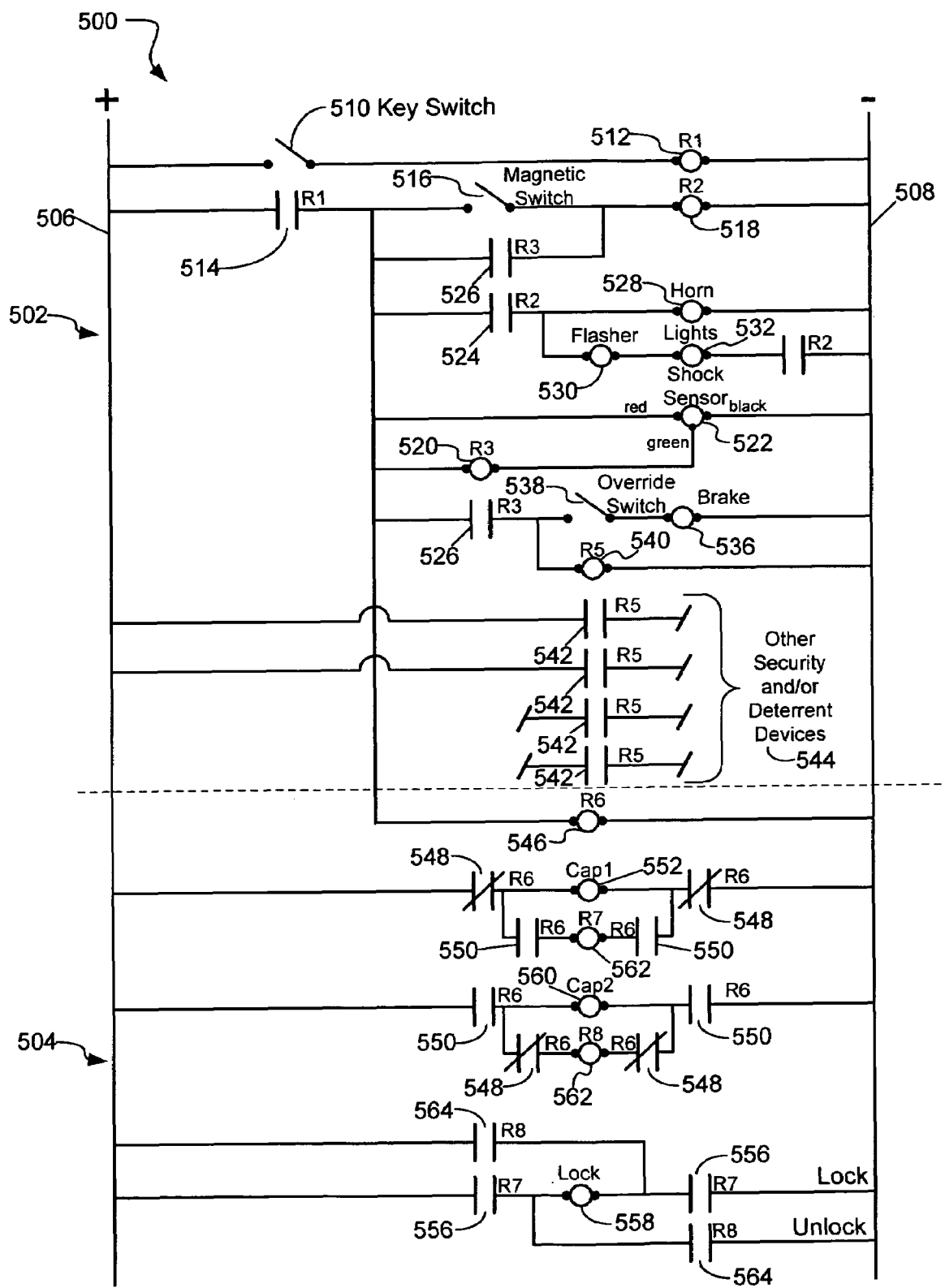
FIG. 5 is a schematic diagram of control circuitry for use in the enclosure security device in accordance with an embodiment of the present invention.

FIG. 5 illustrates relay ladder logic 500 that can be used to implement the controller of the enclosure security device 114 in accordance with an embodiment of the present invention. Relay ladder logic 500 includes security system logic 502 and door lock logic 504. This embodiment of the relay ladder logic 500 receives a signal from a key switch e.g., key switch 118, FIG. 1) that is activated from the outside of the enclosure. This embodiment also receives a signal from a magnetic switch (e.g., magnetic switch 314, FIG. 3) that detects opening of the door of the enclosure.

Vertical bars 506 and 508 represent positive and negative voltage, respectively. Rungs of the relay ladder logic 500 include relays, contacts, coils, capacitors, switches, or other components in a circuit. Power flows from left to right.

Referring to the security system logic 502, when the key switch 510 on the exterior of the enclosure is turned on, a coil 512 on relay one (R1) is energized, closing relay one (R1) contacts 514. When R1 contacts 514 are closed, power is supplied to the magnetic switch 516 on the enclosure door. When R1 contacts 514 are closed, positive voltage is also supplied to R2 coil 518, R3 coil 520, and shock sensor 522. When shock sensor 522 is powered, it is enabled to detect vibration of the enclosure.

When the shock sensor 522 senses a threshold level of shock or vibration, the shock sensor 522 emits a negative voltage level to R3 coil 520. With the voltage potential across R3 coil 520, the R3 contacts 526 are closed. When the R3 contact 526 is closed, the R2 coil 518 is energized. With the R2 coil 518 energized, the R2 contact 524 is closed, which supplies power to the horn alarm 528, and a flasher 530 that is in series with the lights 532. When the enclosure door is opened, the magnetic switch 516 is closed, supplying power to the R2 coil 518 and closes the R2 contact 524, which sends power to the alarm horn 528, and the flasher 530 in series to the enclosure lights 532.

In addition, when R3 contacts 526 are closed, power is supplied to R5 coil 534 and brakes 536 if the override switch 538 is closed. The override switch 538 can be closed to engage the brakes 536 for security. With the override switch 538 closed, when a shock is detected, the brakes 536 will be locked to prevent the enclosure for being easily moved. Alternatively, the override switch 538 can be open if the owner does not want the brakes 536 to lock up. Thus, brake 536 engagement as a security feature can be turned on and off by the user using the override switch 538.

Closing R3 contacts 526 also energizes the R5 coil 540, which closes R5 contacts 542. When closed, R5 contacts 542 supply power to any of one or more optional security and/or deterrent devices 544. Other security and/or deterrent devices can include, but are not limited to, a cell phone dialer, a camera, a video camera, a spotlight, and so on. Connection points can be made available externally to the security device, to enable connection of any of the other security and/or deterrent devices.

Turning to the door lock logic 504, when the key switch 510 is closed and the R1 contacts 514 are closed, R6 coil 546 energizes. As a result, R6 contacts 548, which are normally closed, are then open in response to energizing R6 coils 546. R6 contacts 550, which are normally open, are closed. Prior to opening normally closed R6 contacts 548, capacitor 1 (552) charges because it is connected between positive voltage 506 and negative voltage 508. Opening normally closed R6 contacts 548 and closing normally opened R6 contacts 550 results in discharging capacitor 1 (552) across R7 coil 554. R7 contacts 556 are closed when R7 coil 554 is energized. With R7 contacts 556 closed, the power lock motor 558 is actuated to move the dead bolt to the locked position.

When power is shut off with the key switch 510, then R6 coil 546 causes R6 contacts 550 to open. When R6 contacts 550 are open and normally closed R6 contacts 548 are closed, capacitor 2 (560) discharges across R8 coil 562. When R8 coil 562 is energized, R8 contacts 564 close, which reverses polarity across the lock 558, thereby moving the dead bolt into the unlocked position.

Although FIG. 5 illustrates an embodiment using relay ladder logic, it is to be understood that the functionality of the security device controller can be implemented in numerous different ways and forms. The controller can be implemented in hardware, software, firmware, or any combination thereof. By way of example, the controller can be implemented using a microprocessor executing code, a field programmable gate array (FPGA), an application specific integrated circuit (ASIC), a microcontroller, transistor-transistor logic (TTL), or solid-state electronics. The relay ladder logic 500 depicted in FIG. 5 can be readily adapted to all of these, and other, types of technologies.

Figure 6:
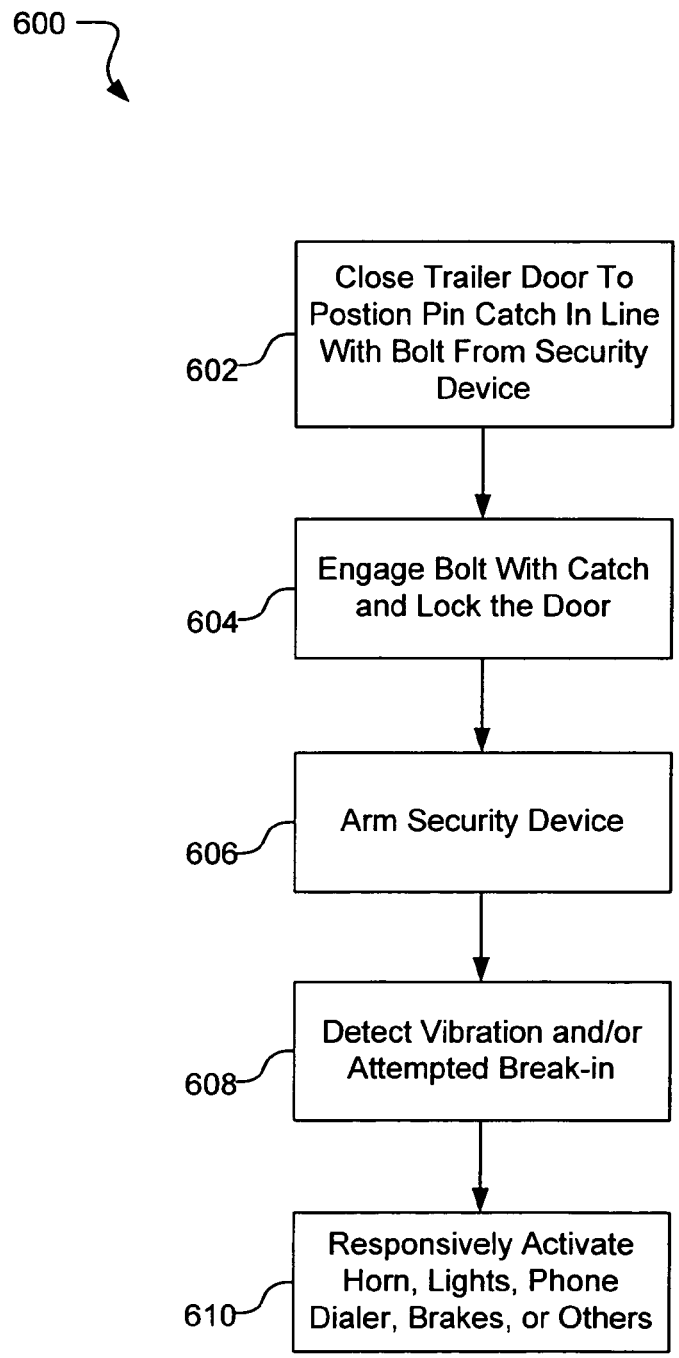
FIG. 6 is a flowchart illustrating an exemplary process for securing an enclosure using embodiments of the enclosure security device.

FIG. 6 is a flowchart illustrating an exemplary process 600 for securing an enclosure using an embodiment of the enclosure security device. In a closing operation 602, the door or gate of the enclosure is closed. In the closing operation 602, a catch portion of a protruding member mounted on the inside of the gate enters an aperture of the security device. In an engaging operation 604 a dead bolt is engaged with the catch to lock the gate or door closed. In one embodiment, the engaging operation 604 is performed by inserting and turning a key that activates a latch to drive the dead bolt.

An arming operation 606 arms the security device. In one embodiment, the arming operation 606 sets a detection switch to monitor for and/or detect opening of the gate or door, and a shock sensor to detect vibration or shock to the enclosure. The arming operation 606 also prepares the security device to carry out security and/or deterrence functions when vibration is detected and/or the gate or door is opened.

A detecting operation 608 detects vibration or opening of the door of the trailer. In one embodiment, the detecting operation 608 is carried out by a shock sensor and/or a magnetic switch, which supply a signal that indicates that a vibration was detected and/or the gate or door was opened, respectively. An activating operation 610 activates one or more security and/or deterrent components in response to the detecting operation 608. In one embodiment, the activating operation 610 sends signals that lock the breaks of a trailer, flashes lights, sounds an alarm, dials a phone number (e.g., via cellular network) and delivers a specified message. Other security and/or deterrence steps may be taken.

Figure 7:
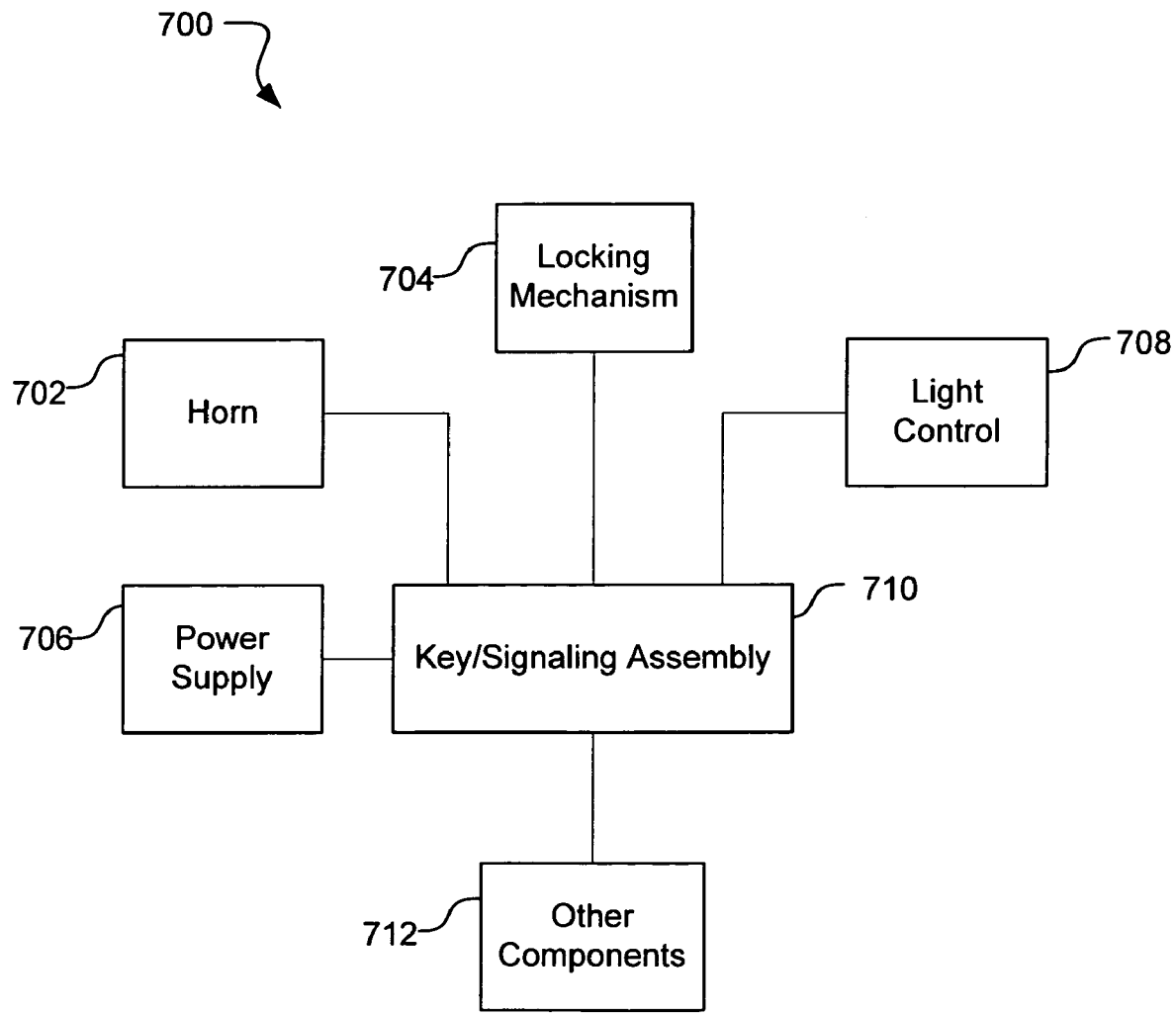
FIG. 7 illustrates a block diagram of a security system in accordance with various embodiments of the present invention.

Embodiments described above include a self-contained modular security device. Such embodiments can be viewed as an accessory that can be added on to an existing enclosure, such as a trailer, to enhance the security and/or functionality of the enclosure. FIG. 7 illustrates a block diagram of security system 700, which may or may not be a self-contained modular device, in accordance with various embodiments of the present invention. In the embodiment depicted, security system 700 includes a horn 702, locking assembly/mechanism 704, power supply 706, light control 708, and key/signaling assembly 710.

Various embodiments may include other components 712, such as camera control modules, communication modules, braking control modules, interfaces for additional intrusion detection mechanisms, and/or the like. Examples of additional intrusion detection mechanisms include, but are not limited to, motion detectors, vibration detectors, glass break sensors, pressure sensitive mats, infrared detectors, and/or the like. According to some embodiments, a trouble shooting module may be used to internally monitor the health and/or status of one or more of the security system's components. In some embodiments, one or more of these modules may be absent. Still yet, in other embodiments, two or more of these modules may be combined into a single module, control device, or assembly.

According to one embodiment, horn 702 may be any type of speaker or other acoustic device that is capable of making a loud warning sound when activated. In accordance with one embodiment, horn 702 may be housed within a housing of the security system 700. In other embodiments, horn 702 may be communicably coupled to security system 700 and mounted outside of a secured enclosure, such as trailer 100. Still yet, in some embodiments, security system 700 may be communicably coupled to a horn associated with an automobile used to move trailer 100.

In one embodiment, locking mechanism 704 may include any mechanical, electrical, or electromechanical fastening device or assembly of devices, which may be used on, or in conjunction with, a door, gate, vehicle, or container for the purpose of restricting access to the area or property enclosed. One example which may be used in accordance with various embodiments of the present invention, is the latch mechanism 412 described earlier. In other embodiments, locking mechanism 704 may be an interface to the electronic locks affiliated with trailer 100, for example. Still yet, in accordance with other embodiments, locking mechanism 704 may include a magnetic locking mechanism for holding a door, gate, or other access point in a closed position.

Power supply 706, according to one embodiment, may be an independent rechargeable battery dedicated to powering the security device. In accordance with one embodiment, multiple batteries and/or other external power supplies may be used to power the security system 700. In one embodiment, power supply 706 may be external to an enclosure of the security system 700. For example, the security system 700 may access the power from a battery associated with a vehicle used in moving trailer 100. In one embodiment, the external power may be supplied by accessing a power generator, solar grid, power line, and/or the like.

In one embodiment, security system 700 includes light control 708. Light control 708 may be an interface module configured to control the lights of the trailer, external flood lights, and/or the like. Light control 708 may be implemented, for example, using hardware, software, or a combination of thereof. In one embodiment, light control 708 may receive control commands from key/signaling assembly 710 and/or locking mechanism 704. For example, key/signaling assembly 710 may send a signal to light control 710 to turn on the lights, flash the lights, or turn off the lights.

In other embodiments, one or more signals may be received from various components. For example, locking mechanism 704 may generate a signal indicating an attempt to circumvent the locks has occurred. In this case, logic associated with the light control may determine under what conditions the lights should be activated.

In one embodiment, key/signaling assembly 710 may be included within the physical housing of security system 700. In other embodiments, key/signaling assembly may be located independently of the housing, but yet communicable coupled. In one embodiment, key/signaling assembly 710 may be configured to activate and deactivate the security system 700. In addition, according to various embodiments, key/signaling assembly may control the activation of, or send control signals to, various control modules such as, for example, lighting control module 708, horn 702, and/or the like. As another example, key/assembly 710 may be configured to activate the brakes of trailer 100 when a security breach is detected. According to one embodiments, the key/signaling assembly 710 may implemented using software, hardware, ASICs, and/or the like.

In various embodiments key signaling assembly 710 may include mechanisms for receiving the input of one or more codes, keys, fingerprint, badge, hand-geometry, retinal scan, encrypted response generator, and/or other securing devices known to those skilled in the art. According to one embodiment, key/signaling assembly module 710 may be configured to use one or more of these inputs to determine what action should be taken. For example, if the key/signaling assembly 710 determines a failed authorization attempt, this may result in an alarm being triggered and/or a timed lockout to prevent experimenting with possible codes. If the key/signaling assembly 710 determines that a successful authorization attempt has occurred, then it may deactivate security system 700.

Various exemplary devices, systems, and methods have been illustrated in the accompanying drawing and described in the foregoing detailed description. It will be understood that the methods and devices shown and described are not limited to the particular embodiments described herein, but rather are capable of numerous rearrangements, modifications, and substitutions without departing from the scope and spirit of the claim set forth below.

What is claimed is:

1. A trailer security device, wherein the trailer comprises a moveable gate configured for opening and closing, the device comprising:
   a housing having a plurality of side walls, wherein one of the side walls is a rear wall configured for mounting to an interior surface of a wall of the trailer, wherein another of the side walls is a facing wall facing an interior surface of the gate when the gate is closed, wherein the facing side wall comprises an aperture configured to receive a protruding member attached to the gate at an angle sufficient to allow the protruding member to extend through the aperture when the gate is closed, wherein the protruding member comprises a catch portion having an aperture;
   an actuator mounted within the housing; and
   a bolt having a distal end coupled to the actuator and a proximate end configured to enter the aperture of the catch portion when the gate is closed, wherein activation of the of the actuator causes the bolt to enter the aperture of the catch portion to engage the protruding member when the gate is closed, thereby preventing extraction of the protruding member from the structural housing, and wherein preventing extraction of the protruding member from the housing prevents opening of the gate.

2. The trailer security device of claim 1, further comprising a key/signaling assembly configured to activate one or more security deterrent devices upon detecting opening of the moveable gate.

3. The trailer security device of claim 2, wherein one of the one or more security deterrent devices is a horn.

4. A method for securing an enclosure using a security device, the method comprising:
  mounting a pin onto an inner surface of a gate of the enclosure, wherein the pin is mounted in alignment with an aperture in a housing of a self-contained security device mounted on an interior surface of the enclosure, wherein the pin includes a catch with an aperture, and wherein the housing includes a locking assembly including a dead bolt in alignment with the aperture of the catch with the pin is extended through the aperture of the housing;
  closing the gate of an enclosure, wherein closing the gate causes the pin to extend through the aperture in the housing of the security device;
  engaging the dead bolt with the catch, wherein engaging causes the dead bolt to enter the aperture of the catch to thereby prevent retraction of the pin;
  arming the security device by setting a detection switch to detect movement of the gate;
  monitoring for movement of the gate to detect a breach in security; and
  activating one or more security deterrent components in response to detecting the breach in security.

5. The method of claim 4, wherein engaging comprises inserting and turning a key that activates a latch to drive the dead bolt.

6. The method of claim 4, wherein engaging a dead bolt with the catch is performed by an actuator in response to a radio frequency (RF) device.

7. The method of claim 4, wherein detecting the breach in security comprises detecting a vibration of the gate.

8. The method of claim 4, wherein detecting the breach in security comprises detecting opening of the gate.

9. The method of claim 4, wherein activating one or more security deterrent components includes sending one or more signals from a control component of the security device to the one or more security deterrent components, wherein the signals cause the one or more security deterrent components to perform a process comprising:
  locking one or more brakes of a trailer;
  flashing one or more lights;
  sounding an alarm; and
  delivering a security breach message to a remote communication device.

* * * * *